July 14, 1925.
C. D. McARTHUR
1,545,672
STATIC DISCHARGER FOR AUTOMOBILE TRUCKS
Filed Dec. 11, 1924
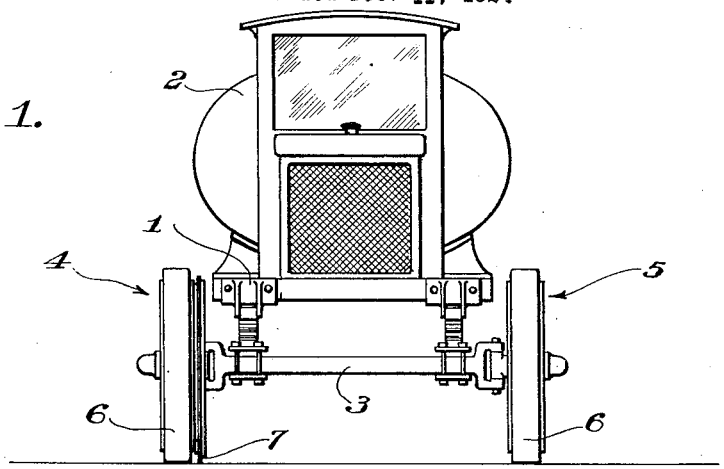
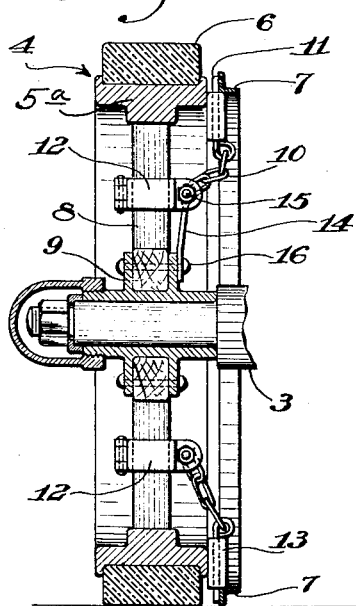
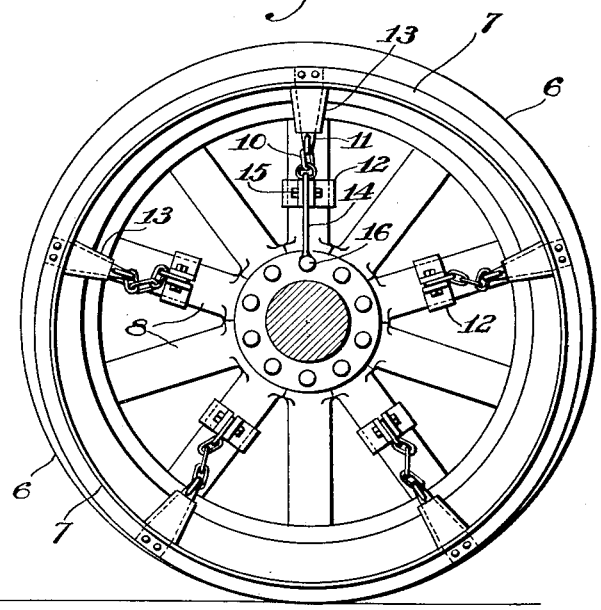
INVENTOR
Charles D. McArthur
by
James C. Bradley
atty.

Patented July 14, 1925.

1,545,672

UNITED STATES PATENT OFFICE.

CHARLES D. McARTHUR, OF PITTSBURGH, PENNSYLVANIA.

STATIC DISCHARGER FOR AUTOMOBILE TRUCKS.

Application filed December 11, 1924. Serial No. 755,210.

*To all whom it may concern:*

Be it known that I, CHARLES D. McAR-THUR, a citizen of the United States, and a resident of Pittsburgh, in the county of Allegheny and State of Pennsylvania, have made a new and useful invention in Improvements in a Static Discharger for Automobile Trucks, of which the following is a specification.

The invention relates to static dischargers for auto trucks, and particularly those employed for carrying gasoline or other highly inflammable, volatile liquids. A considerable amount of electricity is generated in automobiles, incident to their passage through the air, and accumulates in a static charge, due to the fact, that the wheels are provided with rubber tires, which insulate the body of the machine from the ground and prevent the gradual discharge of the electricity. On frequent occasions, explosions have occurred incident to the sparks which are discharged when the machines are stopped and the unloading of the contents of the inflammable liquid is started. To avoid these accumulations of static charges, various expedients have been employed, the most common of which is the use of a chain or a metal bar, carried by a chain, secured to the vehicle axle and allowed to drag upon the ground. While this accomplishes the desired function, these devices have the objection that they are liable to catch on projections on the roadway and cause damage; are noisy and unsightly; and the bar or chain becomes quickly worn away, so that the discharge connection with the ground becomes broken without the knowledge of the driver. The invention here is designed to overcome these difficulties, and provide for a reliable continuous discharge of any static which accumulates, and which is of such a permanent character that after it is once applied, it requires no further attention. One embodiment of the invention is illustrated in the accompanying drawing wherein:

Figure 1 is an end view of a truck with the improvement applied thereto. Fig. 2 is a vertical section through the device and one of the wheels of the truck. And Fig. 3 is a side elevation of the device.

Briefly stated, the discharger comprises a metal ring, which is applied around one of the axles of the vehicle, preferably the front axle, on the inner side of one of the wheels, and supported loosely upon such wheel, so that, while it is retained in a vertical plane and rotates with the wheel, it is free to move up and down relative to the wheel. The lower edge is thus always maintained in contact with the ground. If the wheel spokes are of metal, the connection of the metal ring with such spokes, is all that is necessary to insure a discharge of the static electricity which accumulates in the entire vehicle, since the axle, frame or body, and the tank are all of metal. If the spokes are of wood, and the loose connection of the metal discharge ring is with such spokes, an additional wire or rod leading to the metal hub of the vehicle wheel, is provided, as later described herein.

Referring to Fig. 1, the numeral 1 designates the body of the vehicle; 2 is the tank carried by the body; 3 is the front axle; 4 and 5 are the wheels provided with the usual rubber tires 6, and 7 is the metal discharge ring.

The particular vehicle wheel 5 shown consists of the rim 5ª, the wood spokes 8 and the metal hub 9, but the particular construction of the wheel is of no importance, this type of wheel being illustrated in a rough way merely to show the additional electrical connection which is used when the device is applied to wheels with wood spokes.

The discharge ring 7 lies on the inner side of the wheel and is preferably made from a commercial steel angle section, the ring being of approximately the diameter of the wheel. This ring is supported in loose relation with respect to the wheel by means of the chain links 10 secured to the clips 11 riveted or welded to the ring 7. These links are secured to the collars 12, clamped around the spokes as illustrated. In order to prevent the ring from marring the rim 5ª, the rubber buffers 13 are provided around the clips 11. An electrical connection 14 is provided between one of the collars 12 and the hub 9, such connection being preferably in the form of a metal rod having an eye at each end, with the upper eye fitting around the bolt 15 which secures the collar, and the lower eye encircling a stud bolt 16 screwed into the hub.

What I claim is:

1. The combination with an automobile tank truck having rubber tires, of a static discharger therefor comprising a metal ring mounted alongside one of the wheels of the truck, and loose metal connections between the ring and the wheel, whereby the ring is held upright from the wheel and turns therewith, but which permit it to continuously contact with the roadbed over which the wheel travels, the said ring having electrical connection through said loose metal connections with the body of the truck.

2. The combination with an automobile tank truck having rubber tires, of a static discharger therefor comprising a metal ring mounted alongside one of the wheels of the truck, on the inner side of such wheel, loose metal connections between the ring and the wheel, whereby the ring is held upright from the wheel and turns therewith, but which permit it to continuously contact with the roadbed over which the wheel travels, the said ring having electrical connection through said loose metal connections with the body of the truck.

3. The combination with an automobile tank truck having rubber tires, of a static discharger therefor comprising a metal ring mounted alongside one of the wheels of the truck on the inner side of such wheel, and metal link connections between the ring and the wheel whereby the ring is held upright from the wheel and made to turn therewith, but which permit it to continuously contact with the roadbed over which the wheel travels, the said ring having electrical connection through said link connections with the body of the truck.

4. The combination with an automobile tank truck having rubber tires, of a static discharger therefor comprising a metal ring mounted alongside one of the wheels of the truck, and having a diameter approximately that of such wheel, and loose metal connections between the ring and the wheel, whereby the ring is held upright from the wheel and turns therewith, but which permit it to continuously contact with the roadbed over which the wheel travels, the said ring having electrical connection through said loose metal connections with the body of the truck.

5. A static discharge device for automobile tank trucks, comprising a metal ring of approximately the diameter of the wheel of the truck to which it is to be attached, provided with link connections at spaced intervals having attaching devices secured thereto whereby the ring may be attached to one of the wheels of the truck, so as to provide lost motion between the ring and wheel permitting the ring to drop down and contact continuously with the roadbed over which the wheel travels.

6. A static discharge device for automobile tank trucks, comprising a metal ring of approximately the diameter of the wheel of the truck to which it is to be attached, provided with link connections at spaced intervals having split collars at the ends thereof, whereby the ring may be attached to the spokes of one of the wheels of the truck in such manner as to provide lost motion between the ring and wheel permitting the ring to drop down and contact continuously with the roadbed over which the wheel travels.

In testimony whereof, I have hereunto subscribed my name this 6th day of Dec., 1924.

CHARLES D. McARTHUR.